United States Patent [19]

Satake

[11] 4,450,181

[45] May 22, 1984

[54] METHOD OF HUMIDIFYING POLISHED RICE

[75] Inventor: Toshihiko Satake, Higashihiroshima, Japan

[73] Assignee: Satake Engineering Co., Ltd., Tokyo, Japan

[21] Appl. No.: 496,175

[22] Filed: May 19, 1983

Related U.S. Application Data

[63] Continuation of Ser. No. 175,507, Aug. 5, 1980, abandoned.

[30] Foreign Application Priority Data

Aug. 10, 1979 [JP] Japan .................... 54-101284

[51] Int. Cl.$^3$ .................................. A23L 1/10
[52] U.S. Cl. ................................ 426/507; 426/627
[58] Field of Search .............. 426/511, 303, 304, 627, 426/618, 507, 506, 309, 419, 455, 462

[56] References Cited

U.S. PATENT DOCUMENTS 3,684,526  8/1972  Lowery .................. 426/455
4,055,673  10/1977  Mueller et al. .......... 426/507

OTHER PUBLICATIONS

Houston, D. F.; *Rice: Chemistry and Technology*, American Association of Cereal Chemists, 1972, p. 173.
Stivers et al., "Method of Preventing Deterioration of Grain in Storage", vol. 647, pp. 985–986, O.G. 06-1-9-51.

*Primary Examiner*—Raymond N. Jones
*Assistant Examiner*—Elizabeth J. Curtin
*Attorney, Agent, or Firm*—Charles A. Blank

[57] ABSTRACT

A method of humidifying polished rice wherein moisture is added continuously to the same polished rice and caused to be absorbed thereby by adding moisture proportionally in the amount of moisture with respect to time such that the amount does not exceed 0.3% by weight of the polished rice treated per one hour.

8 Claims, 6 Drawing Figures

METHOD OF HUMIDIFYING POLISHED RICE

This is a continuation, of application Ser. No. 175,507, filed Aug. 5, 1980, now abandoned.

This invention relates to a method of humidifying polished rice.

Generally, it is believed that the standard moisture contents of white rice or polished rice are one of the important factors concerned in obtaining improved taste in cooked rice. The standard moisture contents range, for example, from 14.0 to 15.0%. It has hitherto been customary for farmers to deliver superdried rice of about 13% in moisture content to be on the safe side lest the rice delivered by them should be disqualified upon examination in the process of drying the rice in the form of unhulled rice. Thus hulled rice or brown rice subjected to polishing by a rice-polishing machine has hitherto shown a tendency to have a moisture content of about 13.0% in many cases, and it has generally been customary to subject such brown rice to humidifying treatment to adjust its moisture content to an essentially standard rate of about 14.5% (mean value for a whole grain) to improve its taste. However, brown rice is provided on its surface with a coating containing moisture-repellent wax and low in temperature (generally below 25° C.), so that the resistance offered thereby to humidifying treatment is considerably high. Processes employed in the past for humidifying brown rice have had some disadvantages. In one process known in the art, brown rice is given with moisture of about 0.2–0.3% by weight in a series of operations performed over a period of 10 seconds to 10 minutes, and then the humidified brown rice is subjected to tempering treatment over a period of time longer than the period of time for effecting humidifying. In this process, humidifying and tempering are alternately performed repeatedly. However, moisture remains in the bran layer of the brown rice, and since a large amount of moisture is introduced into the brown rice at a time, cracks are likely to be formed in the brown rice when the moisture content becomes excessive. Crack formation results in sudden invasion of the starch layer by moisture, so that the starch layer also develops cracks due to the shock of sudden expansion. In order to obviate the aforesaid disadvantage, an attempt has been made to humidify brown rice on a moderate scale in a conservative fashion. However, this entails a prolonged period of time for carrying out humidifying and tempering, and difficulties are still experienced in introducing humidity into the inner layers of rice grains. Generally, processes of the prior art have been considered to have difficulties in humidifying brown rice by even 1%.

Thus when the brown rice humidified and tempered by a process of the prior art is processed by a rice-polishing machine, it is usually the case that the majority of its moisture content is eliminated together with bran and released from the machine and the polished rice obtained generally has a moisture content of about 13.5% which is lower than that of brown rice. Thus processes of the prior art for humidifying and tempering brown rice have been unable to produce polished rice of a mositure content of 14.5% which is considered optimum for obtaining cooked rice of improved taste.

In polished rice, starch is exposed and absorption of moisture readily takes place. Thus polished rice is essentially high in moisture absorbing power and humidifying of the inner layers can be readily effected. Moreover, the absorption of moisture takes place actively because the temperature of the polished rice released from a rice-polishing machine is kept at a level over at least 30° C., so that humidifying of polished rice should be effected readily by taking advantage of this quality of polished rice. Even if brown rice is humidified by processes of the prior art, the moisture content is eliminated when the brown rice is polished, so that the processes of the prior art of humidifying brown rice are unable to attain the end of humidifying polished rice to impart an accurate standard moisture content thereto. Thus there is no alternative but to humidify polished rice to accomplish the object of producing polished rice of a moisture content of 14.5% which is optimum for improving the taste of cooked rice.

However, it has hitherto been considered risky to humidify polished rice because the polished rice has an elevated temperature due to the polishing treatment and would immediately absorb humidity when subjected to humidifying treatment, causing crack formation in the rice grains. If processes of the prior art relying on addition of a large amount of water in intermittent operations are followed in humidifying polished rice of high moisture absorbing power, the grains of polished rice would develop cracks as soon as treatment is started.

The present invention obviates the aforesaid disadvantages of the prior art. Accordingly, the invention has as its object the provision of a method of humidifying polished rice wherein humidifying is carried out continuously by adding moisture to polished rice in an optimum proportion to amount with respect to time for carrying out humidification so that no sudden expansion of the grains of polished rice will occur due to the addition of moisture thereto in large amounts, whereby humidifying of polished rice can be effected uniformly with an increased degree of efficiency in a shorter period of time without regard to tempering.

The aforesaid object of the invention can be accomplished by a method of humidifying polished rice comprising the step of continuously adding moisture to the same polished rice and causing the added moisture to be absorbed thereby, wherein the addition of moisture is carried out proportionally in the amount of moisture with respect to time such that the amount does not exceed 0.3% by weight of the polished rice treated per one hour.

If a conventional humidifying process were used for humidifying polished rice, moisture would be added in excess to the surface layers or part of layers of rice grains in 2 to 4 seconds and no moisture would be added for about 15 minutes. This process would be carried out for 1 hour to add moisture of 0.25% by weight in that period while the humidifying step and the prolonged intervals of no addition of moisture are alternated. This would mean that moisture of 0.03–0.015% by weight is added to the surface of rice grains in 1 second. On the other hand, according to the method of the invention, addition of the same amount of moisture or 0.25% by weight to polished rice can be effected by continuously adding moisture of only 0.00007% by weight of moisture in 1 second. Stated differently, the intermittent addition of moisture according to the conventional process is carried out with a moisture density of 400–200 times that of the continuous addition of moisture according to the method of the invention. It is important that addition of moisture be carried out with a low moisture density.

The foregoing and still other advantages of the present invention will be made more apparent from the following detailed explanation of the preferred embodiment of the invention in conjunction with the accompanying drawings, in which.

Figure 1:
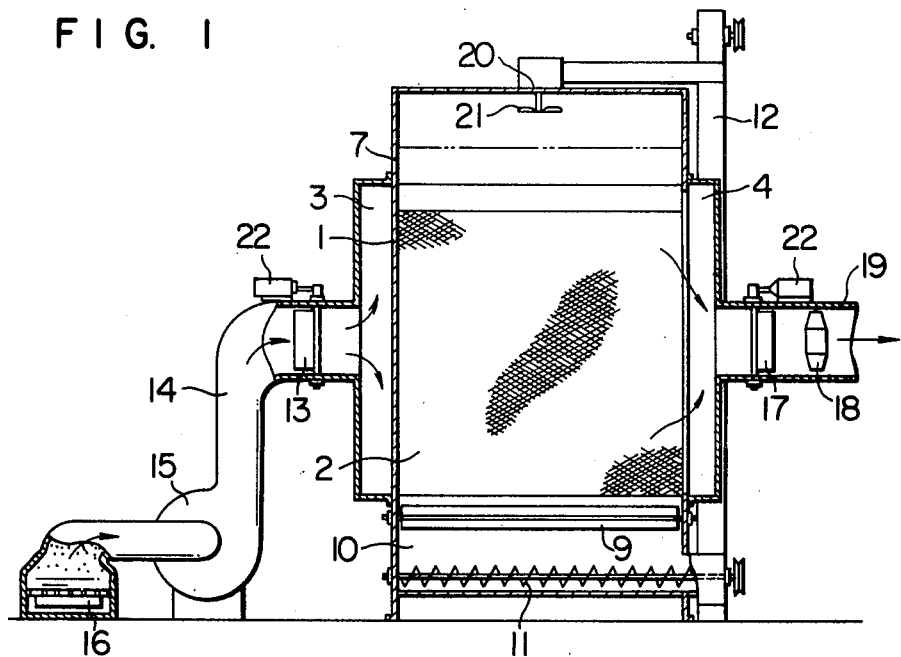
FIG. 1 is a side view, with certain parts being broken away, of a polished rice humidifying apparatus suitable for carrying into practice the method according to the invention.
Figure 2:
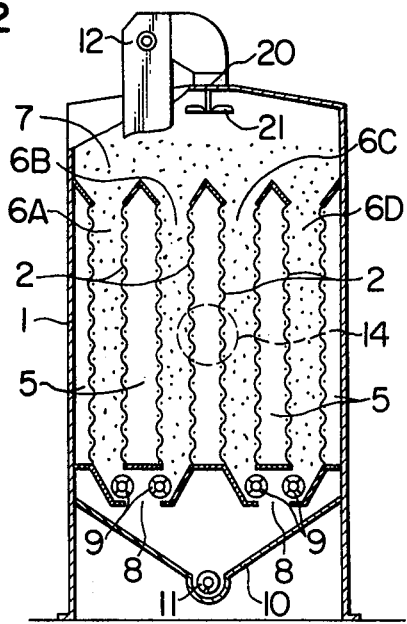
FIG. 2 is a front view, with certain parts being broken away, of the apparatus shown in FIG. 1.
Figure 3:
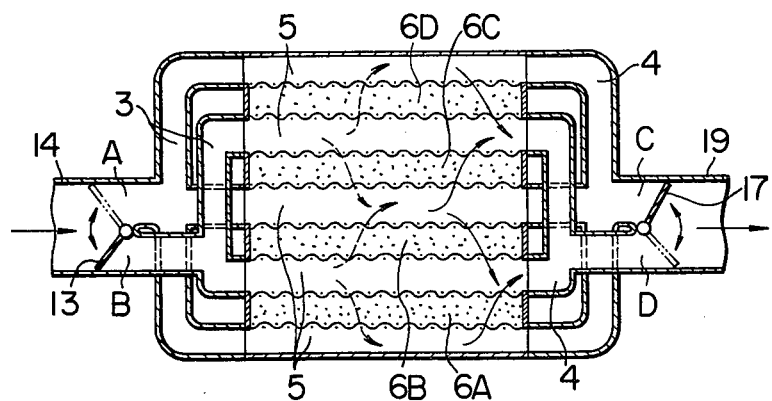
FIG. 3 is a plan sectional view of the apparatus shown in FIG. 1.

An example of the apparatus shown in FIGS. 1-3 suitable for use in carrying the method according to the invention into practice will be described. A grain tank 1 has in its interior a plurality of air-permeable porous walls 2 extending along the length of the tank 1 in suitably spaced-apart relation to define therebetween a plurality of air chambers 5 and a plurality of humidifying chambers 6A, 6B, 6C and 6D located in such a manner that the air chambers 5 and the humidifying chambers 6A, 6B, 6C and 6D are disposed alternately with the air chambers 5 forming the outermost chambers on opposite sides of the tank 1. The air chambers 5 each communicate with an air supply chamber 3 and an air discharging chamber 4 disposed at the front and rear of the tank 1 respectively. The tank 1 has in its upper portion an upper grain tank section 7 communicating with the humidifying chambers 6A, 6B, 6C and 6D and having a grain layer formed of the rice grains supplied thereto and functioning as a cover for preventing air leaks. The upper grain tank section 7 has a volume which is smaller than the total of volumes of the humidifying chambers 6A, 6B, 6C and 6D. The humidifying chambers 6A, 6B, 6C and 6D each have at the lower end an outlet port 8 provided with a discharge valve 9 of the rotary bladed rotor type. The rice grains discharged through the discharge valves 9 are introduced into a screw conveyor 11 mounted in a fluid grain tank 10 disposed at the bottom of the tank 1 which conveys the rice grains to an elevator 12 for returning them to the upper grain tank section 7.

The elevator 12 has mounted in its lower portion a supply hopper for supplying from outside the apparatus polished rice to the upper grain tank section 7 and at its upper portion an outlet port provided with a change-over valve for discharging humidified polished rice to the next operation station upon completion of a humidifying operation. This construction of the elevator 12 is known and detailed description and showing will be omitted.

The air supply chambers 3 are connected to air passages A and B which are selectively opened and closed by an on-off valve 13 mounted in a air supply duct 14 which is connected to a blower 15 and a humidifier 16, such as an ultrasonic humidifier suitable for humidifying a small amount, of a humidifying device. The air discharging chambers 4 are connected to air passages C and D which are selectively opened and closed by an on-off valve 17 mounted in an air discharging duct 19 which also mounts therein an exhaust blower 18. The grain tank 1 is formed at its top with a supply port 20 having a disperser 21 connected thereto through a shaft for rotation to obtain uniform downflow streams of grains. 22 designates an electromagnetic switch for opening and closing each of the on-off valves 13 and 17.

In the apparatus of the aforesaid construction, polished rice to be humidified is supplied to the hopper of the elevator 12 and moved upwardly to the upper grain tank section 7 to form a layer of polished rice grains as shown which functions as a cover for the humidifying chambers 6A, 6B, 6C and 6D for preventing air leakage. Then the on-off valve 13 of the air supply duct 14 is actuated to close the air passage B and open the air passage A on the air supply side, and at the same time the on-off valve 17 of the air discharging duct 19 is actuated to close the air passage C and open the air passage D on the air discharging side, before starting the humidifying device. The humid air supplied by the humidifying device flows through air passage A into the humidifying chambers 6A, 6B, 6C and 6D as indicated by solid line arrows in the drawings, and discharged therefrom through air passage D on the air discharging side. While the humid air flows in currents through the humidifying chambers 6A, 6B, 6C and 6D as aforesaid, the polished rice grains of a grain layer formed in each chamber is humidified by a current of humid air flowing from one direction. By actuating the on-off valves 13 and 17 at a suitable time for opening the air supply side passage B and air discharging side passage C and closing passages A and D, it is possible to cause the humid air supplied by the humidifying device to flow through the humidifying chambers 6A, 6B, 6C and 6D in directions indicated by dash line arrows or in a direction opposite to the direction indicated by solid line arrows, so that the layer of grains in each humidifying chamber can be humidified by a current of humid air flowing in a direction opposite to the one direction described hereinabove. Thus the grain layer in each humidifying chamber can be subjected to humidifying air currents from opposite directions, to thereby obtain substantially uniform humidification of the grains in each layer. Meanwhile the grains in each humidifying chamber humidified as described hereinabove are discharged through the discharge valve 9 into the lower fluid grain tank 10 from which they are returned, via the screw conveyor 11, elevator 12 and disperser 21, to the upper grain tank section 7. When necessary, the grains in the lower fluid grain tank 10 can be discharged to outside through the outlet port formed in the elevator 12.

In the humidifying chambers 6A, 6B, 6C and 6D, moisture which is 0.2-0.3% by weight of the polished rice is uniformly supplied to the polished rice in 60 minutes.

Figure 4:
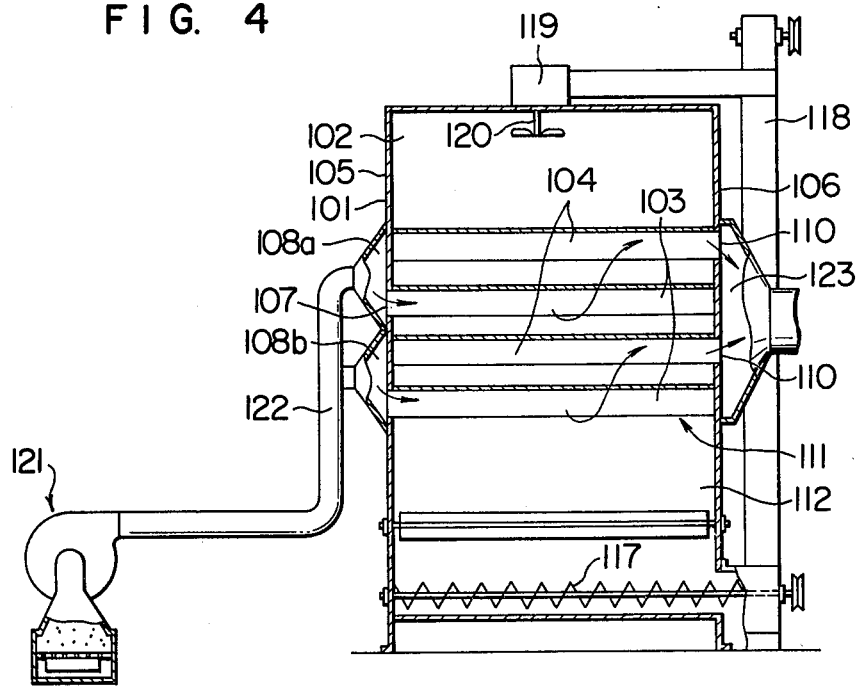
FIG. 4 is a side view, with certain parts being broken away, of another polished rice humidifying apparatus suitable for carrying the method according to the invention into practice.
Figure 5:
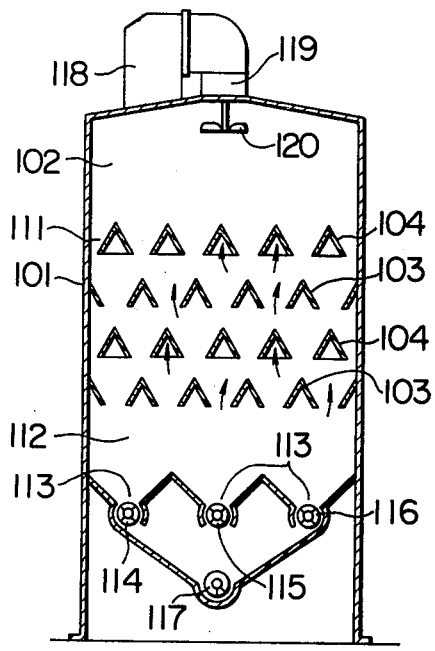
FIG. 5 is a front sectional view of the apparatus shown in FIG. 4.

FIGS. 4 and 5 show another example of the apparatus suitable for use in carrying the method according to the invention into practice. A grain tank 101 has in its interior a plurality of air guides 103 and 104 of the inverted triangle shape in cross section arranged alternately in layers and disposed parallel to one another below an upper chamber 102 of the tank 101 in a manner to extend lengthwise of the tank 101 in a plurality of layers and disposed in a plurality of rows crosswise of the tank 101 between two end walls 105 and 106 of the tank 101.

One end wall 105 is formed with a multiplicity of ventilating openings 107 communicating with one end of the layers of air guides 103 which are closed at the other end by the other end wall 106, so that the air guides 103 serve as humid air supply passages. The other end wall 106 is formed with a multiplicity of ventilating openings 110 communicating with one end of the layers of air guides 104 which are closed at the other end by the one end wall 105, so that the air guides 104 serve as humid air discharging passages. Formed on the outer surface of the end wall 105 in positions corresponding to the openings 107 are an upper air supply chamber 108a and a lower air supply chamber 108b. When the polished rice to be humidified is small in volume, the upper air supply chamber 108a is closed to stop the supply of humid air thereto from an air humidifying device 121 connected to the chamber 108a via a duct 122. Formed on the outer surface of the end wall 106 is a discharging chamber 123 disposed in a position corresponding to the ventilating openings 110. In the apparatus of the aforesaid construction, the grain tank 101 having the air guides of inverted trough shape 103 and 104 disposed therein includes a humidifying section 111 disposed below the upper chamber 102 and having a lower chamber 112 disposed therebelow. In the lower chamber 112, outlet ports 113 are formed in the lower portion thereof and have discharge valves 114 of the rotary bladed rotor type arranged parallel to the air guides 103 and 104 and in a row extending crosswise of the tank 101. The rice grains flowing down through the outlet ports 113 are conveyed by a screw conveyor 117 to an elevator 118 which returns the rice grains to a rice grain supply section 119 of the tank 101. A disperser 120 for obtaining uniform dispersion of the rice grains is mounted in the upper chamber 102 of the tank 101.

Figure 6:
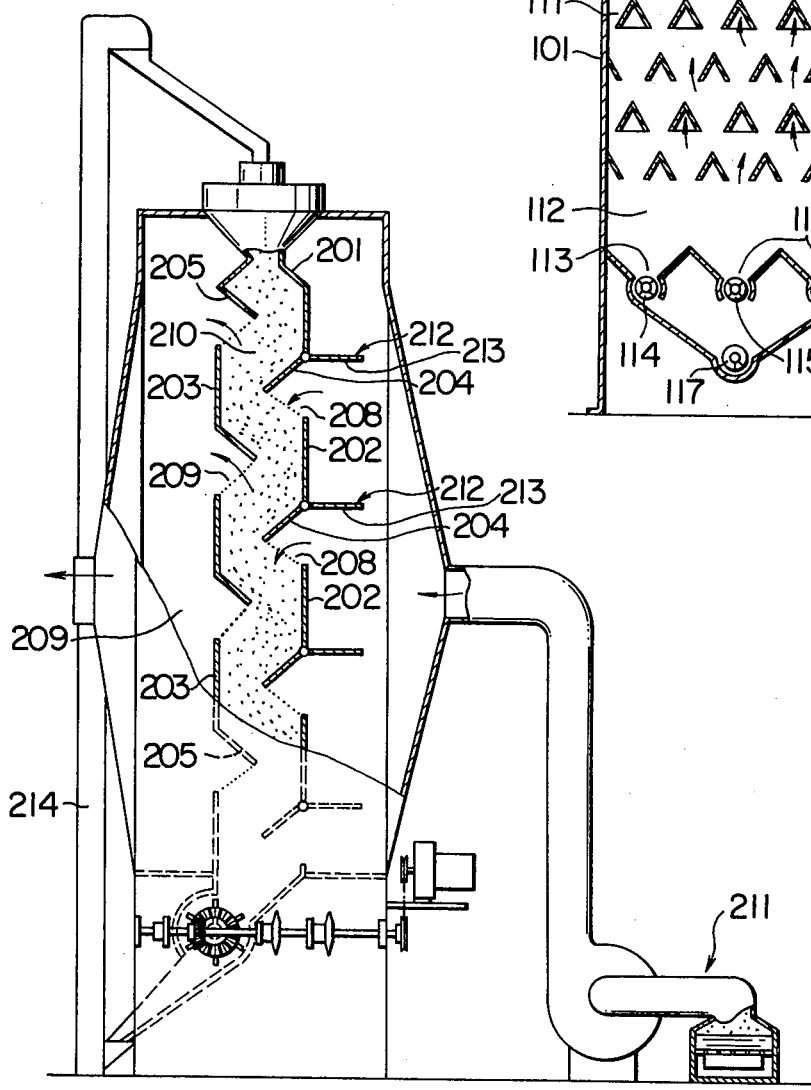
FIG. 6 is a side view, with certain parts being broken away, of still another polished rice humidifying apparatus suitable for carrying the method according to the invention into practice.

FIG. 6 shows still another example of the apparatus suitable for use in carrying the method according to the invention into practice. A humidifying vessel 201 is formed with a front end wall 202 and a rear end wall 203 each including discrete portions. Each discrete portion of the front end wall 202 has attached to its lower end an on-off valve 212 composed of an inclined wall portion 204 and a outwardly projecting member 213 and capable of moving in pivotal movement. Each discrete portion of the rear end wall 203 has an inclined wall portion 205 attached to its lower end. The inclined wall portions 204 and 205 are disposed in staggered relation in two rows, and an air supply passage 208 is formed below each inclined wall portion 204 while an air discharging passage 209 is formed below each inclined wall portion 205. The humidified air supplied from the air humidifying device 211 flow across a passage 210 of polished rice grains or a humidity adjusting chamber in currents flowing through the air supply passages 208 into the chamber 210, until the air currents reach the air discharging passages 209. The polished rice grains flow in a zigzag stream through the passage 210 while being uniformly humidified. When the vessel 201 is not filled with the polished rice grains, the inclined wall portions 204 are not pushed by the grains so that the on-off valves 212 pivotally supported by the front end wall 202 are actuated to close the air supply passages 208 by weight of the outwardly extending members 213 heavier than the weight of the inclined wall portions 204, to thereby prevent air leakage. When the polished rice flows downwardly through the passage 210 as shown in FIG. 6, the inclined wall portions 204 are pushed by the grains to move downwardly so that the air supply passages 208 are opened.

The above-mentioned apparatus may have a grain lifting apparatus 214 connected thereto, so that the same polished rice grain can be recycled to flow downwardly through the passage 210 several times in the vessel 201, to thereby obtain satisfactory humidification of polished rice grains.

From the foregoing description, it will be appreciated that the method according to the invention for humidifying polished rice is characterized by supplying to the polished rice humidity which is 0.2–0.3% by weight of the polished rice to be humidified in 60 minutes. The invention has enabled humidification of polished rice, which has hitherto been considered unfeasible, to be effected satisfactorily. This enables adjustments of humidity content of polished rice to be effected immediately before the rice is cooked for food, thereby permitting polished rice of accurate moisture content having improved taste to be provided. The humidified polished rice provided by the present invention is of high quality and devoid of crack formation.

What is claimed is:

1. A method of humidifying polished rice, comprising the step of:

adding moisture to the polished rice at a rate to cause the rice to adsorb the moisture progressively so that its moisture content increases gradually and continuously or almost continuously at approximately 0.2 to 0.3 percent by weight of the polished rice per one hour, until the desired moisture content is achieved.

2. A method of humidifying polished rice as defined in claim 1, further comprising the step of continuously moving the polished rice from a first location to a second location, the moisture being continuously added to the polished rice while it is moved from the first location to the second location.

3. A method of humidifying polished rice as defined in claim 2, wherein the rice moving from the first to the second locations descends under gravity.

4. A method of humidifying polished rice as defined in claim 3, wherein the descent of the rice is substantially vertical.

5. A method of humidifying polished rice as defined in claim 3, wherein the descent of the rice follows a zig-zag path.

6. A method of humidifying polished rice as defined in any one of claims 2 to 5, wherein the rice is continuously recycled through said moistureadding step until the polished rice has its final moisture content of approximately 14 to 15 percent.

7. A method as defined in any one of claims 1 to 4, wherein the moisture is added by passing moist air through the moving rice.

8. A method as defined in claim 7, wherein the direction of flow of the moist air is periodically reversed.

* * * * *